United States Patent
Asai et al.

(10) Patent No.: US 11,562,185 B2
(45) Date of Patent: Jan. 24, 2023

(54) EXTRACTION METHOD, EXTRACTION DEVICE, AND COMPUTER-READABLE RECORDING MEDIUM

(71) Applicant: FUJITSU LIMITED, Kawasaki (JP)

(72) Inventors: Tatsuya Asai, Kawasaki (JP); Keisuke Goto, Kawasaki (JP); Hiroaki Iwashita, Tama (JP); Kotaro Ohori, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 357 days.

(21) Appl. No.: 16/799,963

(22) Filed: Feb. 25, 2020

(65) Prior Publication Data

US 2020/0279141 A1  Sep. 3, 2020

(30) Foreign Application Priority Data

Feb. 28, 2019 (JP) ............... JP2019-037041

(51) Int. Cl.
*G06N 20/00* (2019.01)
*G06K 9/62* (2022.01)
*G06V 10/75* (2022.01)

(52) U.S. Cl.
CPC ......... *G06K 9/6289* (2013.01); *G06K 9/6232* (2013.01); *G06N 20/00* (2019.01); *G06V 10/751* (2022.01)

(58) Field of Classification Search
CPC .................................................. G06K 9/6289
USPC ...................................... 706/12, 48; 705/30
See application file for complete search history.

(56) References Cited

U.S. PATENT DOCUMENTS

| | | | |
|---|---|---|---|
| 2003/0172043 A1* | 9/2003 | Guyon | G16B 40/30 706/48 |
| 2015/0332414 A1* | 11/2015 | Unser | G06F 16/285 705/30 |
| 2016/0314491 A1 | 10/2016 | Shani et al. | |
| 2017/0061956 A1* | 3/2017 | Sarikaya | G06N 20/20 |
| 2019/0034812 A1* | 1/2019 | Borrel | G06N 5/04 |

FOREIGN PATENT DOCUMENTS

| | | |
|---|---|---|
| JP | 2015-028732 A | 2/2015 |
| JP | 2017-068875 | 4/2017 |

OTHER PUBLICATIONS

EESR—Extended European Search Report dated Apr. 29, 2020 for European Patent Application No. 20159014.8.
JPOA—Office Action of Japanese Patent Application No. 2019-037041, dated Oct. 25, 2022, with English translation.

* cited by examiner

*Primary Examiner* — Ruay Ho
(74) *Attorney, Agent, or Firm* — Fujitsu Patent Center (57) ABSTRACT

A non-transitory computer-readable recording medium stores therein an extraction program that causes a computer to execute a process including: generating a plurality of combinations of conditions relating to a plurality of item values included in data; calculating an index value that indicates a degree of cooccurrence between a specified response variable and each of the plurality of combinations, by using a machine learning model that estimates a response variable from the plurality of item values, the machine learning model having been trained by using the data; and extracting a specific combination from among the plurality of combinations based on any one of the condition and the index value.

7 Claims, 11 Drawing Sheets

| 141 | | | | | EXPLANATORY VARIABLE | | | RESPONSE VARIABLE |
|---|---|---|---|---|---|---|---|---|
| DATE | CLICK COUNT | DAY | TIME PERIOD | PRECEDING EVENT | REMAINING BUDGET | ... | ADVERTISED PRICE |
| 2019/6/5 10:00 | 100 | HOLIDAY | PM | SNS | 10000 | ... | LOWER |
| 2019/6/8 14:00 | 90 | WEEKDAY | PM | NEWS | 5000 | ... | MAINTAIN |
| 2019/6/11 22:00 | 110 | WEEKDAY | AM | VIDEO STREAMING | 250000 | ... | RAISE |
| ... | | | | | | | |

| SIGNIFICANCE | RESPONSE VARIABLE | CONDITION OF EXPLANATORY VARIABLE |
|---|---|---|
| 0.85 | REMAINING BUDGET IS AVAILABLE ∧ CLICK COUNT≧100 ∧ DAY=HOLIDAY | RAISE |
| 0.8 | REMAINING BUDGET IS NOT AVAILABLE ∧ DAY=WEEKDAY | MAINTAIN |
| 0.78 | REMAINING BUDGET IS NOT AVAILABLE ∧ TIME PERIOD=AM | LOWER |
| 0.67 | CLICK COUNT≧100 ∧ DAY=WEEKDAY | MAINTAIN |
| 0.58 | REMAINING BUDGET IS AVAILABLE ∧ CLICK COUNT<100 ∧ DAY=WEEKDAY | RAISE |
| 0.5 | REMAINING BUDGET IS AVAILABLE ∧ CLICK COUNT≧100 ∧ PRECEDING EVENT=NEWS | MAINTAIN |
| ... | | |

FIG.4

| SIGNIFICANCE | VARIABLE |
|---|---|
| 0.91 | REMAINING BUDGET |
| 0.78 | DAY |
| 0.65 | CLICK COUNT |
| ... | |
| 0.03 | TIME PERIOD |
| 0.02 | PRECEDING EVENT |
| ... | |

FIG.5

|  | $\bar{C}\bar{D}$ | $\bar{C}D$ | $CD$ | $C\bar{D}$ |
|---|---|---|---|---|
| $\bar{A}\bar{B}$ |  |  |  | $N_1$ |
| $\bar{A}B$ | $P_1$ |  | $P_2$ |  |
| $AB$ |  | $P_4$ | $N_3$ |  |
| $A\bar{B}$ |  | $P_3$ |  | $N_2$ |

EXTRACTION METHOD, EXTRACTION DEVICE, AND COMPUTER-READABLE RECORDING MEDIUM

CROSS-REFERENCE TO RELATED APPLICATION

This application is based upon and claims the benefit of priority of the prior Japanese Patent Application No. 2019-037041, filed on Feb. 28, 2019, the entire contents of which are incorporated herein by reference.

FIELD

The embodiments discussed herein are related to an extraction program, an extraction method, and an extraction device.

BACKGROUND

A technique of optimizing advertising placement has been known. Particularly, in digital marketing, planning and implementation of a measure for the optimization can be done based on results of log data analysis (for example, Japanese Laid-open Patent Publication No. 2015-028732).

However, the above technique has a problem that it can be difficult to increase efficiency of planning and implementation of a measure. For example, a case in which a significance of each item value in log data is calculated by logistic regression or the like, and based on the significance, analysis is further performed, combining multiple item values is considered. In this case, the number of combinations is enormous, and it is difficult to perform the analysis, considering all kinds of combinations by the related technique. Therefore, in the related technique, it can be difficult to bring the results of log data analysis to contribute to improvement of efficiency of planning and implementation of a measure.

SUMMARY

According to an aspect of the embodiments, a non-transitory computer-readable recording medium stores therein an extraction program that causes a computer to execute a process including; generating a plurality of combinations of conditions relating to a plurality of item values included in data; calculating an index value that indicates a degree of cooccurrence between a specified response variable and each of the plurality of combinations, by using a machine learning model that estimates a response variable from the plurality of item values, the machine learning model having been trained by using the data; and extracting a specific combination from among the plurality of combinations based on any one of the condition and the index value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that the embodiment is not intended to limit the present invention. Moreover, the embodiments can be combined within a range not causing a contradiction.

Functional Configuration

Figure 1:
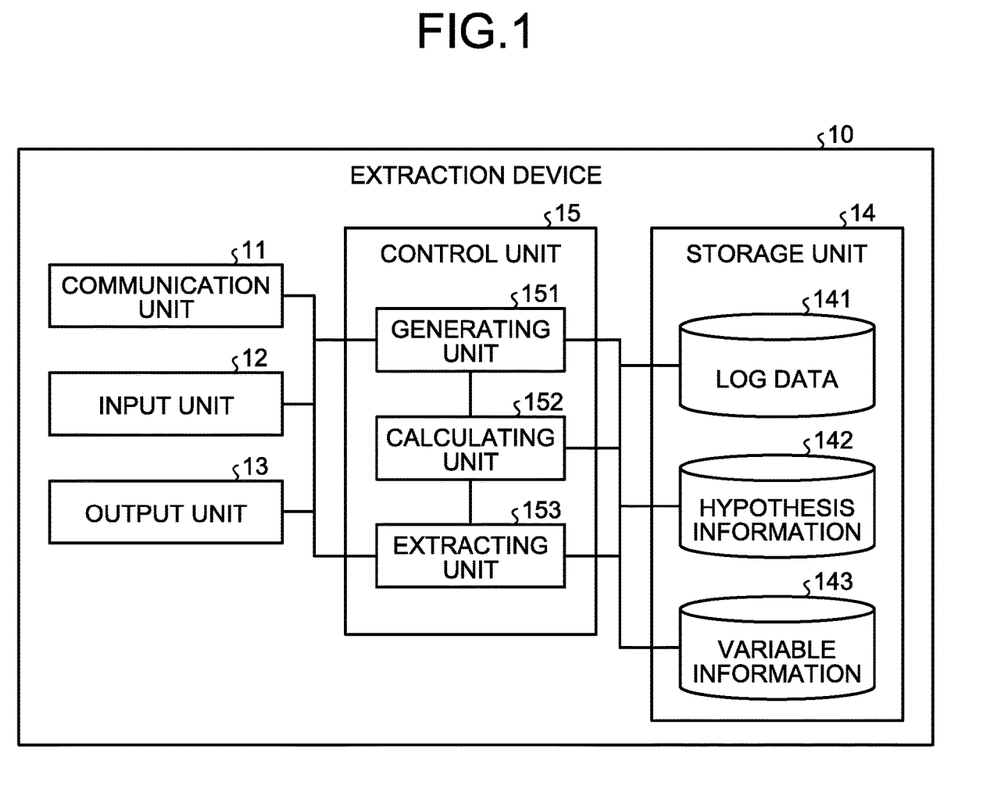
FIG. 1 illustrates an example of a functional configuration of an extraction device according to an embodiment.

A functional configuration of an extraction device according to an embodiment will be described, using FIG. 1. FIG. 1 illustrates an example of a functional configuration of the extraction device according to an embodiment. As illustrated in FIG. 1, an extraction device 10 includes a communication unit 11, an input unit 12, an output unit 13, a storage unit 14, and a control unit 15.

The communication unit 11 is an interface to perform data communication with other devices. For example, the communication unit 11 is a network interface card (NIC), and performs data communication through the Internet.

The input unit 12 is a device for a user to input information. For example, the input unit 12 is a mouse and a keyboard. Moreover, the output unit 13 is a display, or the like that displays a screen. Furthermore, the input unit 12 and the output unit 13 may be a touch panel display.

The storage unit 14 is an example of a storage device that stores data, a program executed by the control unit 15, and the like, and is, for example, a hard disk or a memory. The storage unit 14 stores log data 141, hypothesis information 142, and variable information 143.

Figure 2:
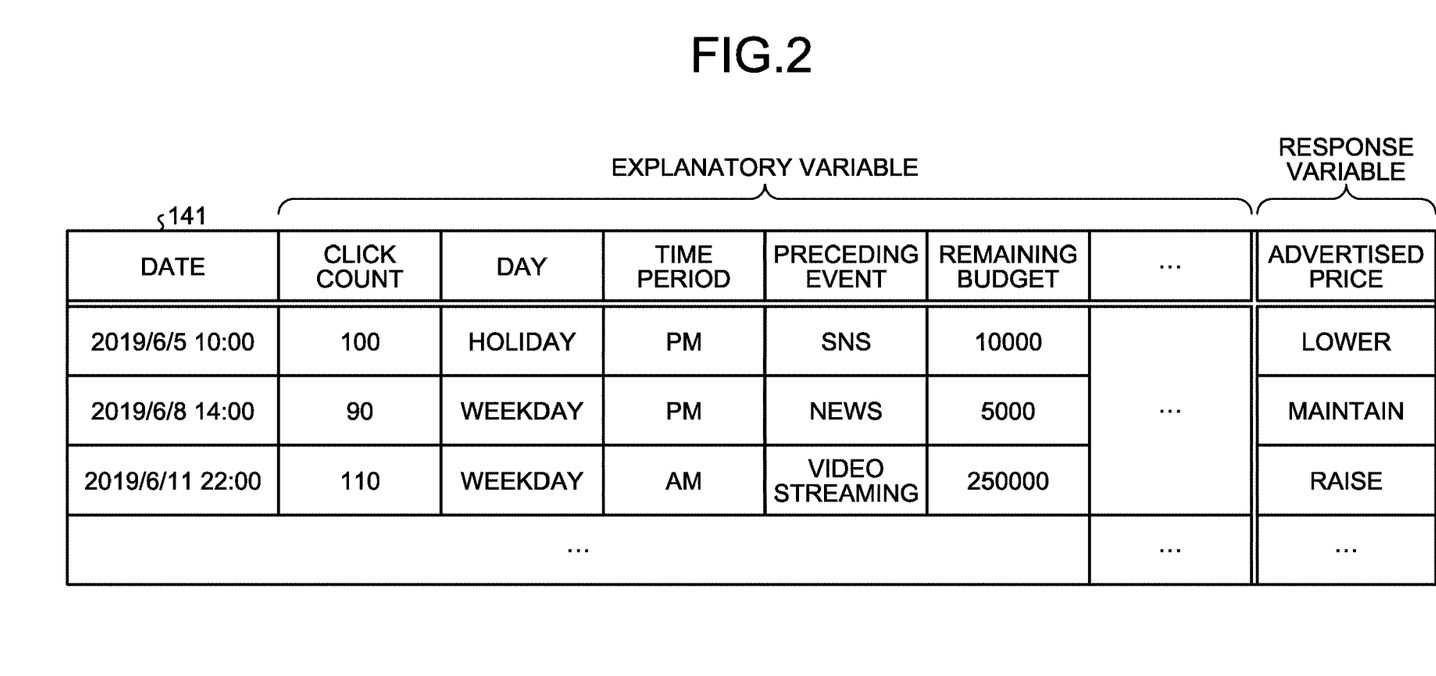
FIG. 2 illustrates an example of log data.

The log data 141 is data having a response variable and multiple explanatory variables with respect to the response variable as item values. FIG. 2 illustrates an example of log data. As illustrated in FIG. 2, the log data 141 has a date as a key. The log data 141 thus has a date as a key, and may be chronological data, data of which increases as time passes.

In the embodiment, the log data 141 is data in which information about an advertisement placed on the Web collected on a predetermined date, and a measure taken for the information are associated with each other.

The log data 141 is sometimes used as training data to train s model to draw an effective measure. Therefore, for example, a measure in the log data 141 may be one that is planned by a skilled planner. Moreover, the log data 141 may be collection of data of cases in which an implemented measure has been successful.

As illustrated in FIG. 2, the log data 141 includes, as the explanatory variables, "click count", "day", "time period", "preceding event", and "remaining budget". Moreover, the log data 141 includes "advertised price" as the response variable. The response variable "advertised price" indicates whether to raise an advertised price, to maintain the advertised price, or to lower the advertised price.

For example, in a first row in FIG. 2, it is indicated that information indicating that the click count of one advertisement in the afternoon of a holiday is 100 times, and the remaining budget of the advertisement is 10,000 yen is collected at 10:00 on Jun. 5, 2019. Furthermore, in the first row in FIG. 2, it is indicated that a measure to lower the advertised price has been taken for the advertisement.

Figure 3:
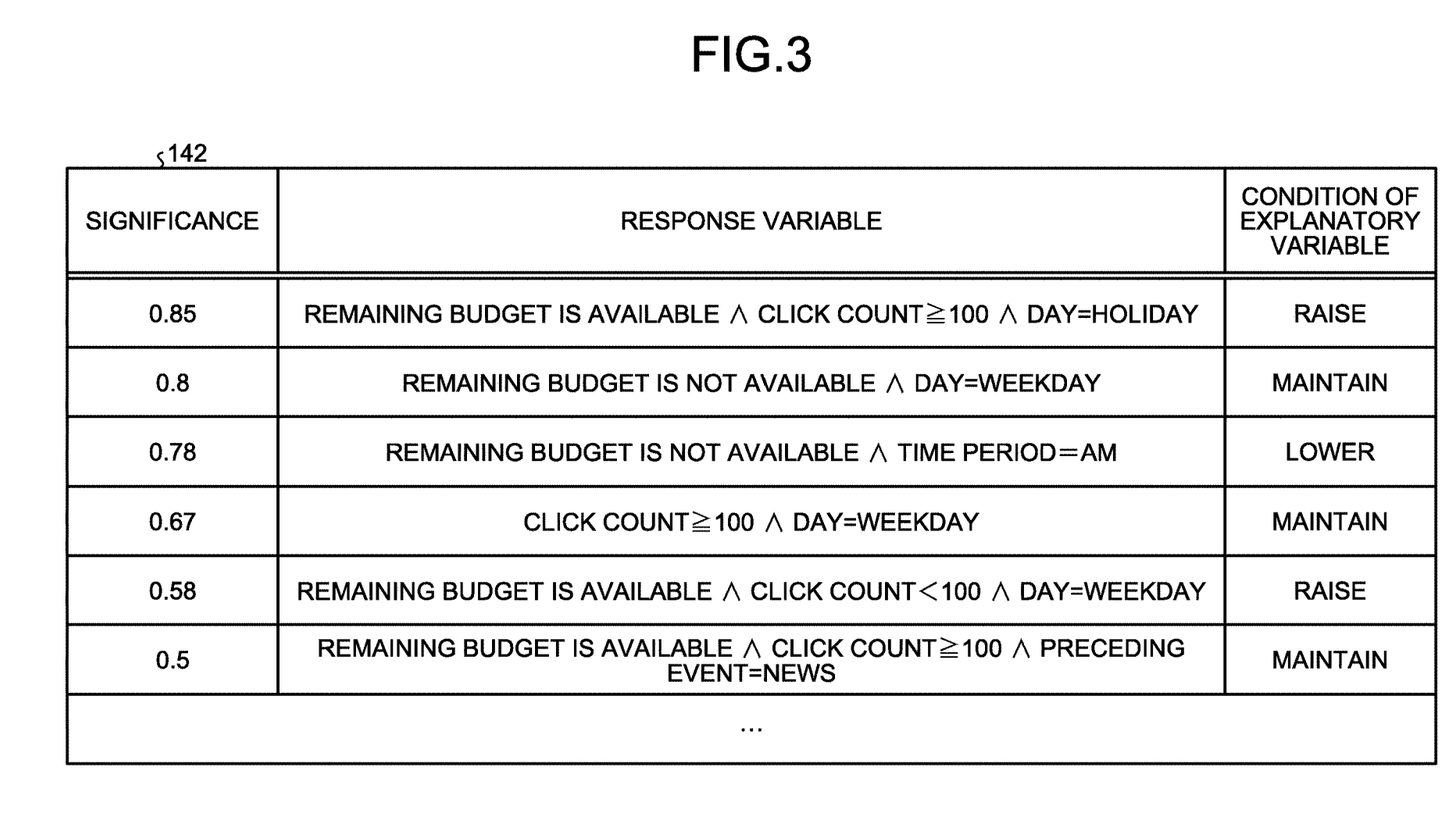
FIG. 3 illustrates an example of hypothesis information.

The hypothesis information 142 is information in which a combination of a responsible variable and a condition relating to one or more explanatory variables corresponding to the response variable and a significance are associated with each other. The significance herein is an example of an index value. FIG. 3 illustrates an example of the hypothesis information. In the following description, the combination in the hypothesis information 142 can be referred to as hypothesis. Moreover, a calculation method of the significance will be described later.

For example, in the first row in FIG. 3, it is indicated that the significance of a hypothesis that "raise the advertised price when remaining budget is available/\click count≥100/\day=holiday" is 0.85.

Furthermore, the hypothesis may be a combination of conditions relating to multiple item values, without distinguishing the explanatory variable and the response variable. In this case, the hypothesis in the first row in FIG. 3 may be expressed as "remaining budget is available/\click count≥100/\day=holiday/\raise advertised price".

Figure 4:
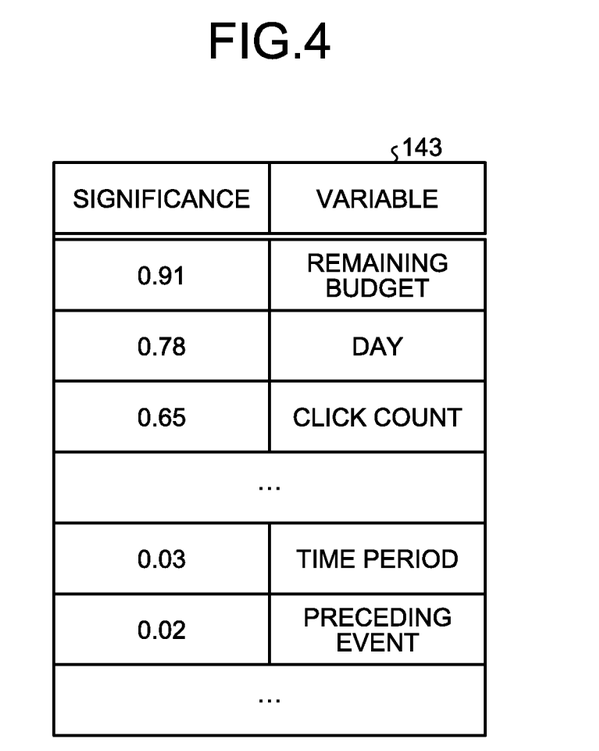
FIG. 4 illustrates an example of variable information.

The variable information 143 indicates a significance of each variable. FIG. 4 illustrates an example of the variable information. For example, in the first row in FIG. 4, it is indicated that the significance of the variable "remaining budget" is 0.91. The significance of each variable may be one calculated by the same method as the significance of the hypotheses, or may be one calculated by a method different from that of the significance of the hypotheses. For example, the significance of each variable may be one calculated by a known method, such as the logistic regression.

The control unit 15 is implemented by a program stored in the internal storage device executed by a central processing unit (CPU), a micro processing unit (MPU), a graphics processing unit (GPU), or the like, using a random-access memory (RAM) as a working area. Moreover, the control unit 15 may be implemented by an integrated circuit, such as an application specific integrated circuit (ASIC) and a field programmable gate array (FPGA). The control unit 15 includes a generating unit 151, a calculating unit 152, and an extracting unit 153.

The generating unit 151 generates a combination of conditions relating to plural item values included in data, namely, a hypothesis. The generating unit 151 can generate a hypothesis from data including an explanatory variable and a response variable, such as the log data 141. In this case, the generating unit 151 generates a combination of a response variable and a condition relating to one or more explanatory variables corresponding to the response variable, as a hypothesis.

Moreover, the generating unit 151 generates a combination of conditions relating to plural item values included in data that increases as time passes. For example, the generating unit 151 can generate a combination from chronological data to which data is added as time passes, such as the log data 141.

Figure 5:
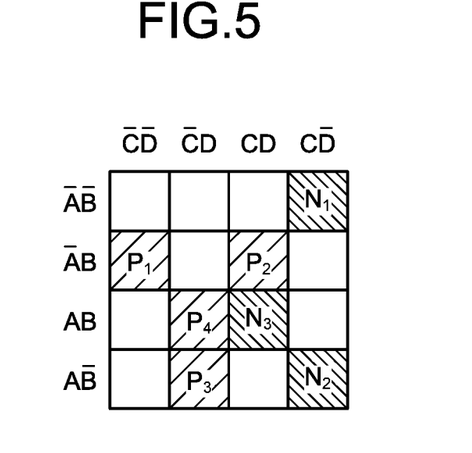
FIG. 5 is an illustration of relationship between a variable and data.

A method of generation by the generating unit 151 will be described by using FIG. 5 to FIG. 9. FIG. 5 is an illustration of a relationship between a variable and data. As illustrated in FIG. 5, conditions relating to each explanatory variable in the log data 141 includes four conditions of A, B, C, and D. Moreover, negation of A is expressed as ⁻A (– right above A). For example, when A indicates a condition that "remaining budget is available", ⁻A indicates a condition that "remaining budget is not available". Furthermore, for example, when B indicates a condition that "click count≥100", ⁻B indicates that "click count<100".

Moreover, $P_1, P_2, P_3, P_4, N_1, N_2, N_3$ are data included in the log data 141, and expresses data in which a response variable and a condition of an explanatory variable are associated with each other. In this example, $P_i$ expresses data indicating that a value of the response variable is "raise", and $P_j$ expresses data indicating that a value of the response variable is "lower" (where I and j are arbitrary positive integer). As illustrated in FIG. 2, "maintain" is included in values of the response variable, besides "raise" and "lower", but it is explained herein, assuming that the values of the response variable have two kinds, "raise" and "lower". Furthermore, in the following description. "raise" may be expressed as +, and "lower" as –.

Figure 6:
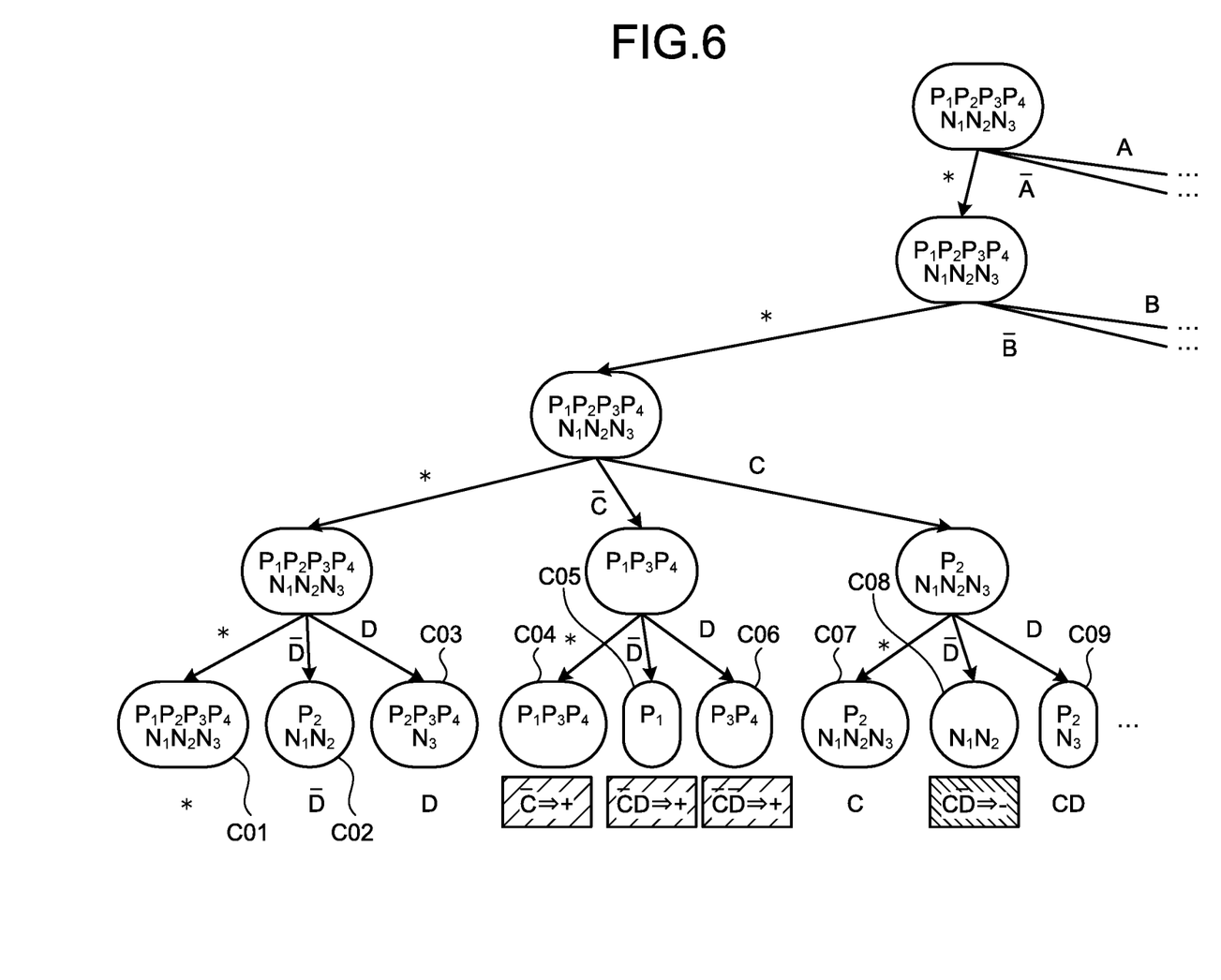
FIG. 6 is an illustration of generation of a hypothesis.

First, as illustrated in FIG. 6, the generating unit 151 comprehensively enumerates possible combinations of values, for each of the explanatory variables included in $P_1, P_2, P_3, P_4, N_1, N_2, N_3$. FIG. 6 is an illustration of the generation of a hypothesis. Possible values herein are * (not used), 1 (used), and 0 (use negation of a condition).

The generating unit 151 may limit the number of explanatory variables to be combined, to the number equal to or smaller than a predetermined number. For example, the generating unit 151 may limit the number of explanatory variables to be combined to two or less in a case of four explanatory variables of A to D. In this case, the generating unit 151 combines at least two out of the four explanatory variables to be * (not used). When the number of explanatory variables increases (for example, 1000 variables), the number of combinations explosively increases. Therefore, by limiting the number, increase in the number of combinations to be enumerated can be suppressed in advance.

The generating unit 151 classifies the enumerated combinations to either of $P_1, P_2, P_3, P_4, N_1, N_2, N_3$, and determines whether it is an effective combination that satisfies a specific condition. For example, the specific condition is that the frequency of agreement between a condition of an explanatory variable and data in the log data 141 is equal to or higher than a predetermined value. In this case, the generating unit 151 can generate a combination of conditions, the frequency of which of agreement with data is equal to or higher than the predetermine value, out of the conditions.

In the example in FIG. 6, a combination C01 in which all of the four explanatory variables A to D are *, a combination C04 being ⁻C, a combination C09 being CD (C and D are 1, and A and B are *), and the like are enumerated.

As illustrated in FIG. 6, the generating unit 151 enumerates data corresponding to each of the combinations C01 to C09 based on the explanatory variables of $P_1, P_2, P_3, P_4, N_1, N_2, N_3$. For example, the generating unit 151 enumerates $P_2, N_1, N_2$ as data corresponding to the combination C02. IN this case, the data enumerated for the combination C02 includes data in which the response variable is + ($P_2$), and data in which the response variable is – ($N_1, N_2$) in a mixed manner. Therefore, the combination C02 has a low possibility of being a hypothesis correctly explaining whether the response variable is + or –. As a result, the generating unit 151 does not adopt the combination C02 as an effective hypothesis.

On the other hand, the generating unit 151 enumerates $N_1$, $N_2$ as data corresponding to the combination C08. In this case, data enumerated for the combination C08 includes only data in which the response variable is – ($N_1$, $N_2$). Therefore, the generating unit 151 adopts the combination C08 as an effective hypothesis.

Moreover, even when different response variables are included in a mixed manner, the generating unit 151 may adopt the combination as an effective hypothesis depending on the ratio of mixed variables. For example, when 80% or more of response variables of data corresponding to one combination are +, the generating unit 151 may adopt the combination as an effective hypothesis.

Furthermore, the generating unit 151 exclude a combination corresponding to a special case of one combination from the hypothesis. For example, the combinations C05 and C06 in FIG. 6 are a special case of the combination C04. This is because the combinations C05 and C06 are only ones in which a literal is added to the combination C04.

Figure 7:
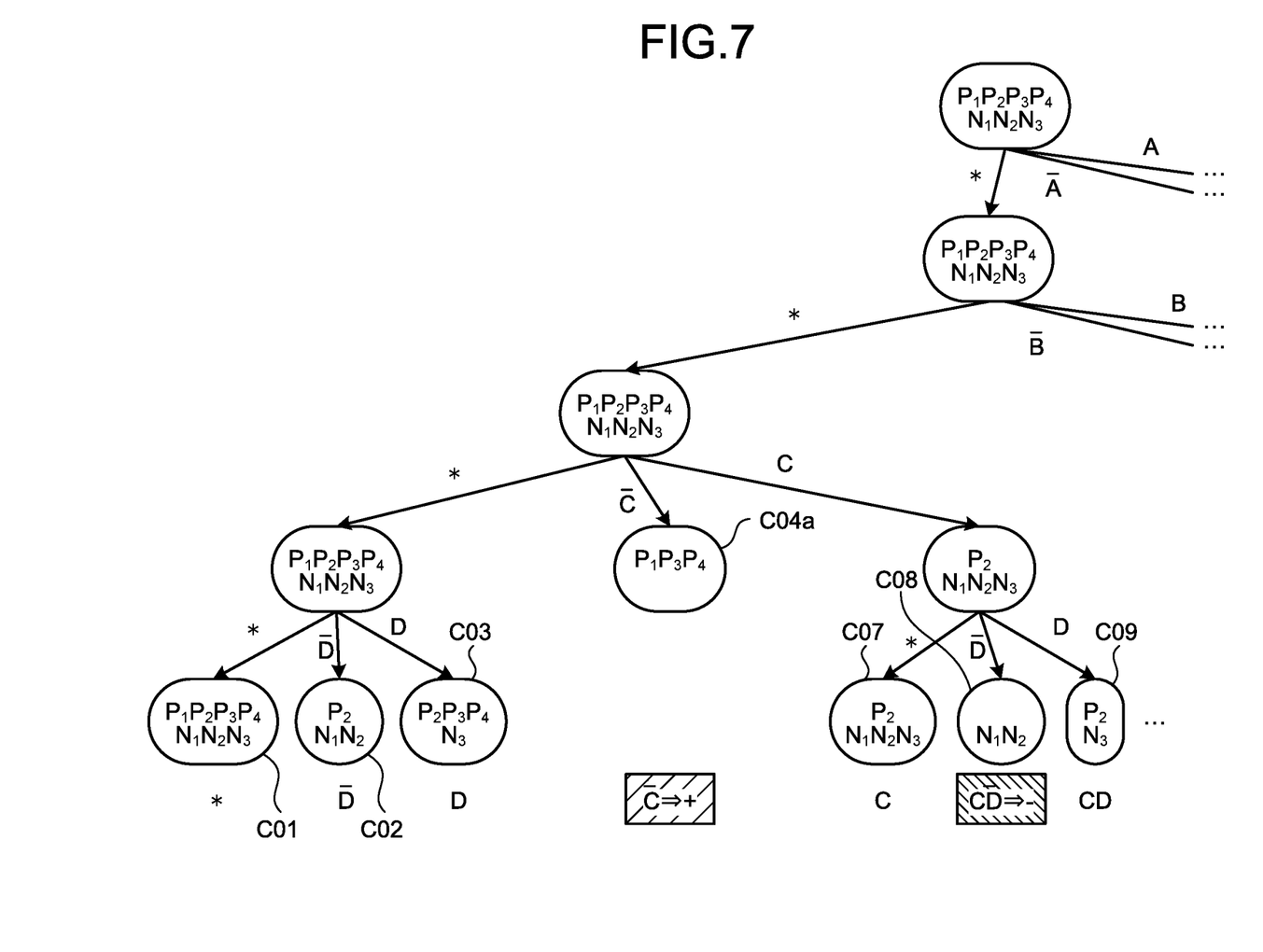
FIG. 7 is an illustration of generation of a hypothesis.
Figure 8:
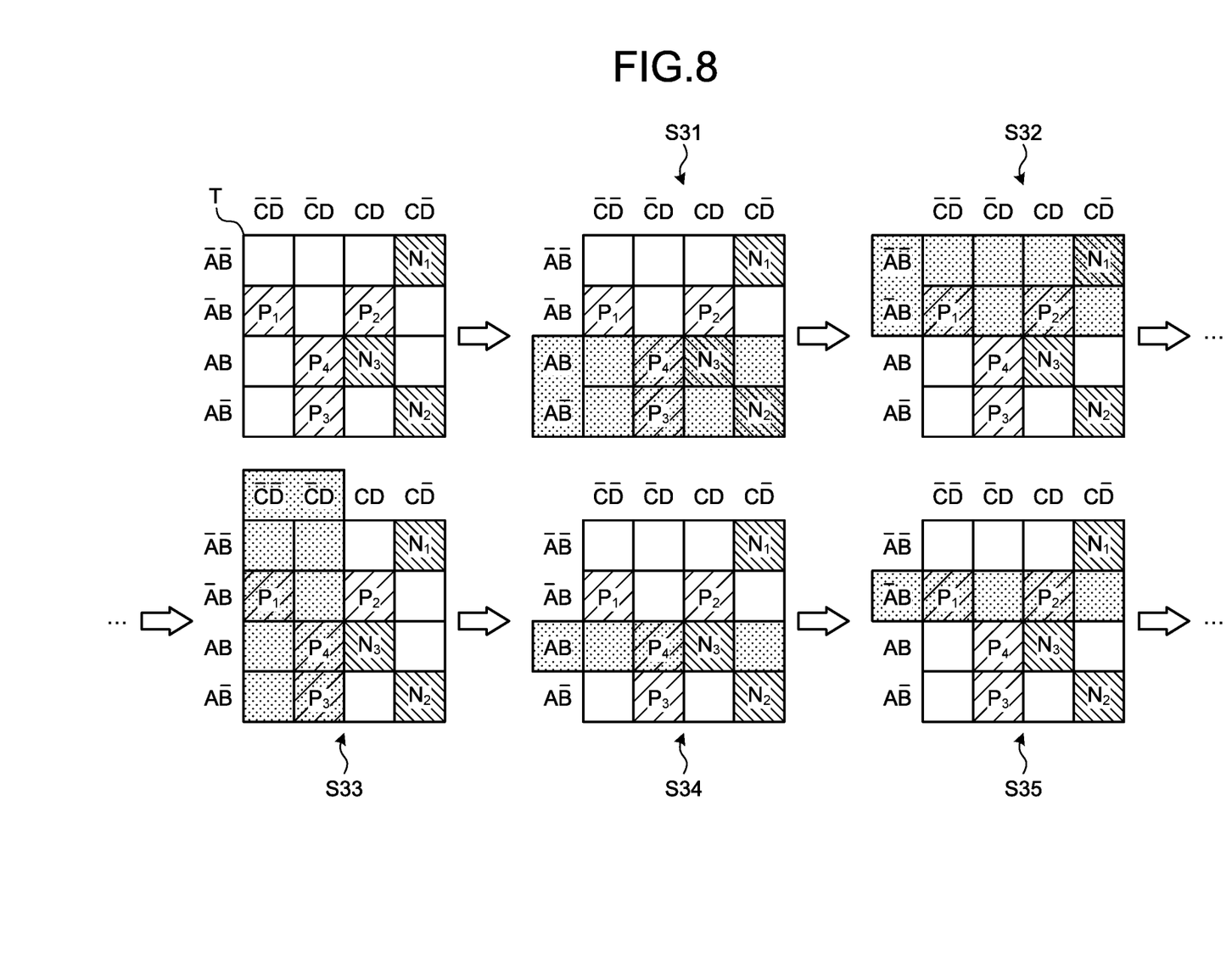
FIG. 8 is an illustration of generation of a hypothesis

The generating unit 151 adopts combinations illustrated in FIG. 7 as hypotheses. That is, the generating unit 151 adopts the combinations C01, C02, C03, C04a, C07, C08, and C09 as an effective hypothesis. Note that a combination C04a is one in which a special case of C04 is omitted among combinations satisfying ⁻C.

FIG. 7 is an illustration of the generation of a hypothesis. FIG. 7 illustrates contents of FIG. 5 and FIG. 6 in a Karnaugh map. AS illustrated in FIG. 7, the generating unit 151 examines an effective combination while changing combinations in sequence of a combination of A (B, C, D are * (not used)) (S31), a combination of ⁻A (B, C, D are * (not used)) (S32), . . . (S31 to S35, . . . ).

To a combination of ⁻C at S33, data in which the response variable is + ($P_1$, $P_3$, $P_4$) corresponds. That is, at S33, the number or the ratio of the data classified to a class of + ($P_1$, $P_3$, $P_4$) is equal to or larger than a predetermined value. Therefore, the generating unit 151 determines that the combination of ⁻C at S33 as an effective combination (hypothesis) classified to the class of +. Note that a combination in which a literal is added to ⁻C is excluded in the following processing.

Next, the generating unit 151 starts examination of combinations in which two explanatory variables are * (not used) after examination of all combinations in which three explanatory variables are * (not used) (S34). To a combination of A⁻B at S35, training data in which the response variable is + (Pr, $P_2$) corresponds. That is, at S35, the number of the ratio of the training data ($P_1$, $P_2$) classified to the class of + is equal to or higher than the predetermined value. Therefore, the generating unit 151 determines that the combination of A⁻B at S35 is an effective combination (hypothesis) classified to the class of +.

Figure 9:
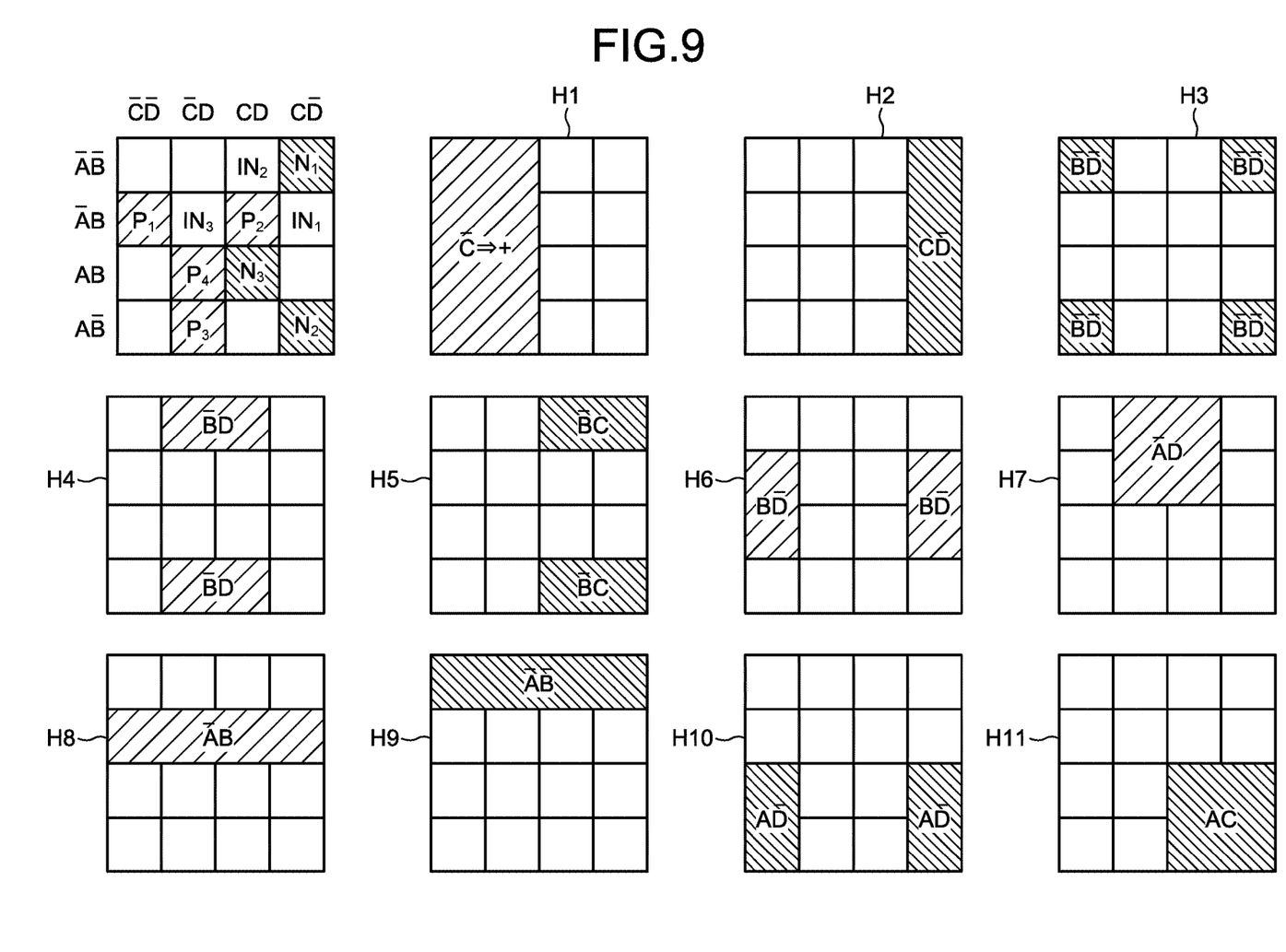
FIG. 9 is an illustration of an example of a generated hypothesis.

FIG. 9 is an illustration of an example of a generated hypothesis. As illustrated in FIG. 9, the generating unit 151 generates hypotheses H1 to H11, the classification result of which is + or –, from $P_1$, $P_2$, $P_3$, $P_4$, $N_1$, $N_2$, $N_3$, and stores the generated hypotheses in the storage unit 14 as the hypothesis information 142.

Each of the hypotheses H1 to H11 is an independent hypothesis satisfying a requirement that the classification result of each data being + or – is correctly explained. Accordingly, there is a case in which hypotheses are contradictory to each other, as the hypothesis H2 and the hypothesis H6.

Figure 10:
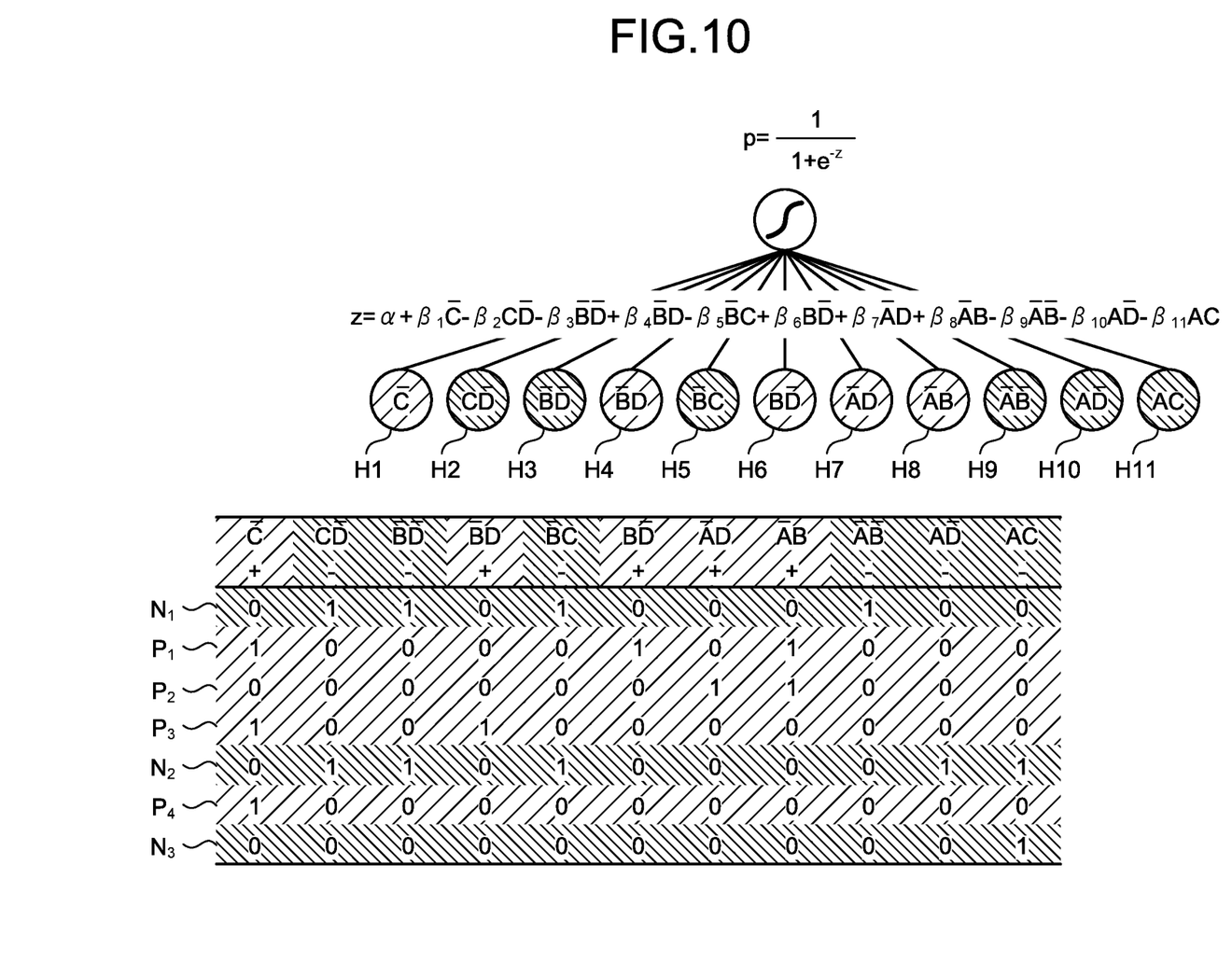
FIG. 10 is an illustration of calculation of a significance by logistic regression.

The calculating unit 152 calculates a significance, which is a degree of cooccurrence of data per combination, by using a model that has learned data. For example, the calculating unit 152 calculates the significance of each hypothesis by the logistic regression. FIG. 10 is an illustration of the calculation of the significance by the logistic regression. The calculating unit 152 applies the log data 141 to a model expression illustrated in FIG. 10, to calculate optical coefficients $\beta_1$ to $\beta_{11}$. The calculating unit 152 updates the significance of the hypothesis information 142 with the calculated coefficients.

At this time the significance of each hypothesis is an index value that increases as the cooccurrence in the log data 141 increases. Moreover, the significance can be regarded as a plausibility of the response variable when the condition of each explanatory variable is satisfied. Therefore, the calculating unit 152 calculates the plausibility of satisfying the condition of the response variable as the significance.

The extracting unit 153 extracts a specific combination from among the combinations based on the condition or the significance. That is, the extracting unit 153 extracts a hypothesis that is considered to be significantly important from the hypothesis information 142, based on the significance. For example, the extracting unit 153 extracts a combination, the significance of which is equal to or higher than the predetermined value from among the combinations.

Moreover, the hypothesis extracted by the extracting unit 153 and the significance of each hypothesis are displayed by the output unit that functions as a display device, such as a display, in list form. At this time, the output unit 13 displays a condition relating to a variable that is not important singly but becomes important when combined with another variable in an emphasized manner.

The output unit 13 displays, when the significance of a first combination, which is a combination of a first condition and another condition, is higher than a first criterion and the significance of only the first condition is equal to or lower than a second criterion, the first combination in an emphasized manner compared to other combinations.

For example, suppose that the first criterion is that "the significance of a hypothesis is 0.5 or higher". Moreover, suppose that the second criterion is that "the significance of a variable is 0.1 or lower". In this case, from FIG. 3, the significance of a hypothesis, "when remaining budget not available/\time period=AM, the price is lowered" is 0.78, and is higher than the first criterion. Moreover, from FIG. 4, the significance of the variable, "time period" is 0.03, and is equal to or lower than the second criterion. Therefore, for example, the output unit 13 displays the part of "time period=AM" in an emphasized manner by changing the font or style, and by marking or the like.

Figure 11:
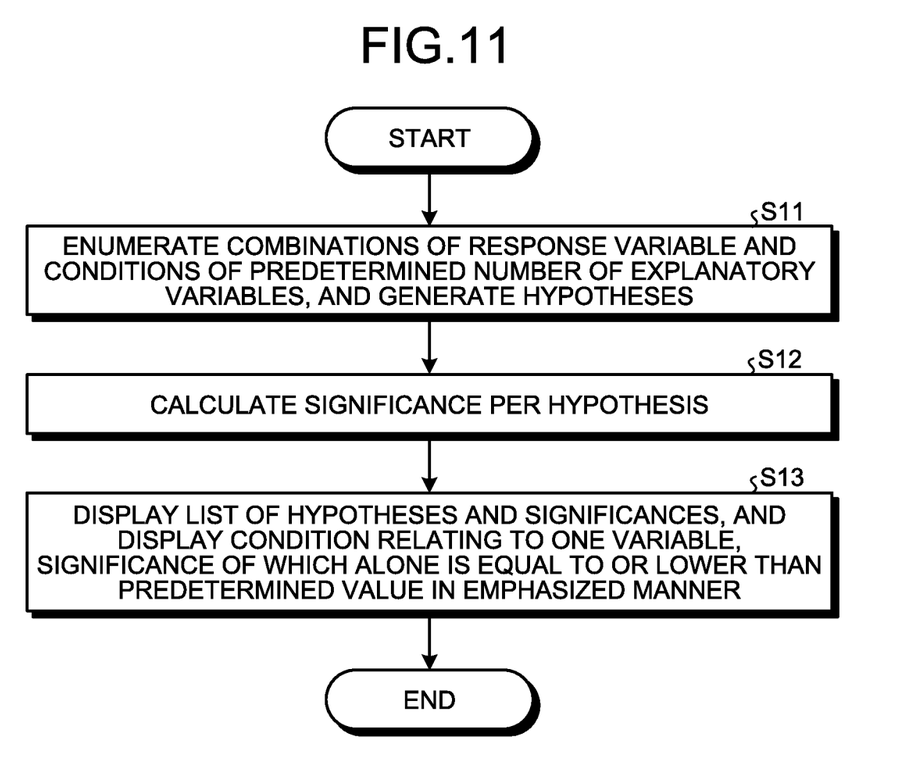
FIG. 11 is a flowchart illustrating a flow of extraction processing.

A flow of processing performed by the extraction device 10 will be described by using FIG. 11. FIG. 11 is a flowchart illustrating a flow of the extraction processing. As illustrated in FIG. 11, first, the extraction device 10 enumerates combinations of a response variable and conditions of the predetermined number of explanatory variables, and generates hypotheses (step S11). For example, the extraction device 10 excludes a combination not satisfying a specific condition, or a combination being a special case of one combination from the hypotheses.

Next, the extraction device calculates the significance of each hypothesis (step S12). The extraction device 10 then displays the hypotheses and the significances in list form, and displays a condition for a variable, the significance of which alone is equal to or lower than the predetermined value in an emphasized manner (step S13)

Effect

As described above, the extraction device 10 generates combinations of conditions relating to plural item values included in data. The extraction device 10 calculates the significance, which is a degree of cooccurrence of data per combination, by using a model that has learned data. The extraction device 10 extracts a specific combination from among the combinations based on the condition or the significance. As described, the extraction device 10 can perform evaluation of the significance per condition in which plural item values are combined. Therefore, according to the embodiment, the enormous number of hypotheses generated by combinations of item values can be evaluated, and the efficiency of planning and implementation of a measure can be improved.

The extraction device 10 generates a combination of the response variable and a condition relating to one or more explanatory variables corresponding to the response variable. The extraction device 10 calculates a plausibility of satisfying the condition of the response variable per combination as the significance. Therefore, according to the embodiment, evaluation of hypothesis based on a model to estimate the response variable from the explanatory variable is enabled.

The extraction device 10 extracts a combination, the significance of which is equal to or higher than a predetermined value, from among the combinations. Thus, the extraction device 10 comprehensively calculates the significance of the respective combinations, and then extracts a combination considered to be important. Accordingly, the extraction device 10 can provide a hypothesis that is particularly important for measure planning.

The extraction device 10 displays a list of combinations extracted by the extracting unit, emphasizing a first combination compared to other combinations when the significance of the first combination, which is a combination of a first condition and another condition, is higher than a first criterion, and when the significance of only the first condition is equal to or lower than a second criterion. A hypothesis including a variable, the significance of which is not high when it is considered singly is particularly difficult to be found by humans According to the embodiment, it is possible to present such a hypothesis, while indicating that it is difficult to find.

The extraction device 10 generates a combination of conditions, the frequency of which of matching with data is equal to or higher than a predetermined value, out of the conditions. Thus, the extraction device 10 excludes a condition that is considered to be not important in advance and, therefore, can improve the efficiency of calculation.

The extraction device 10 generates a combination of conditions relating to plural item values included in data that increases as time passes. Therefore, the extraction device 10 can perform extraction of hypothesis when the number of pieces of data is still small.

In the above embodiment, a case in which the response variable indicates whether to raise, maintain, or lower the advertised price has been described. On the other hand, the response variable may indicate whether a conversion (CV) has occurred in each advertisement. In this case, similarly to the example in FIG. 6 and the like, the response variable can be expressed in a binary value.

System

The processing procedure, the control procedure, the specific names, and the information including various kinds of data and parameters described in the above document and the drawings can be changed arbitrarily, unless otherwise specified. Moreover, the specific example, the distribution, numeric values, and the like described in the embodiment are only examples, and can be changed arbitrarily.

Moreover, the illustrated respective components of the respective devices are of functional concept, and it is not necessarily requested to be configured physically as illustrated. That is, specific forms of distribution and integration of the respective devices are not limited to the ones illustrated, and all or a part thereof can be configured to be distributed or integrated functionally or physically in arbitrary units according to various kinds of loads, usage conditions, and the like. Furthermore, as for the respective processing functions performed by the respective devices, all or an arbitrary part thereof can be implemented by a CPU and a program that is analyzed and executed by the CPU, or can be implemented as hardware by wired logic.

Hardware

Figure 12:
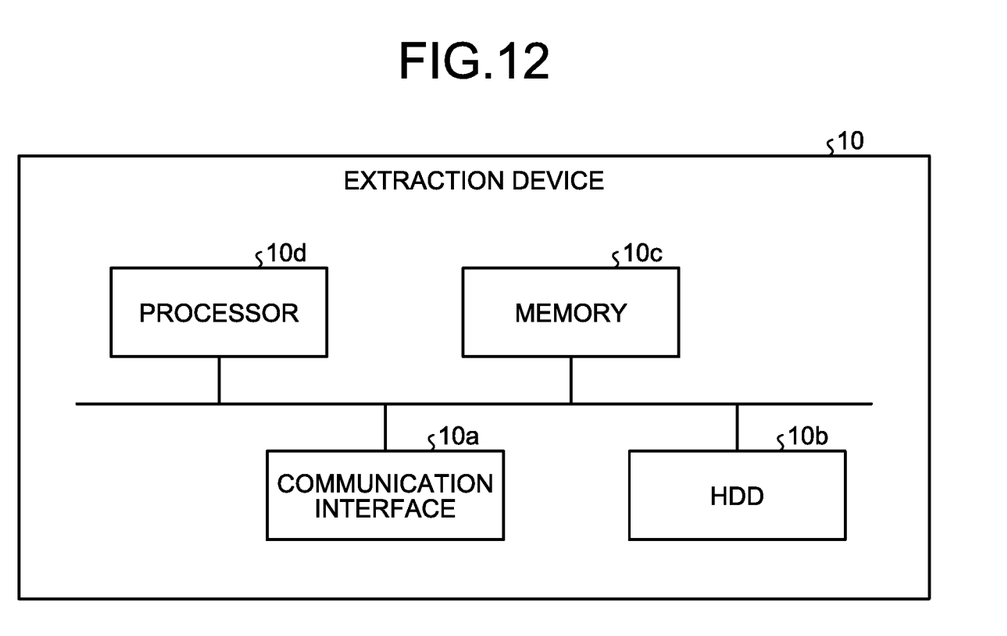
FIG. 12 is an illustration of a hardware configuration example.

FIG. 12 is an illustration of a hardware configuration example. As illustrated in FIG. 12, the extraction device 10 includes a communication interface 10a, a hard disk drive (HDD) 10b, a memory 10c, and a processor 10d. Moreover, the respective parts illustrated in FIG. 12 are connected to each other through a bus, or the like.

The communication interface 10a is a network interface card, or the like, and performs communication with other servers. The HDD 10b stores a program and database (DB) to activate the functions illustrated in FIG. 1.

The processor 10d executes a process to implement the respective functions described in FIG. 1 and the like by reading a program to perform processing similar to that of the respective processing units illustrated in FIG. 1, from HDD 10b or the like, and developing it on the memory 10c. That is, the process implements functions similar to those of the respective processing units included in the extraction device 10. Specifically, the processor 10d reads a program having functions similar to those of the generating unit 151, the calculating unit 152, and the extracting unit 153 from the HDD 10b. The processor 10d then executes the process to implement the processing similar to those of the generating unit 151, the calculating unit 152, the extracting unit 153, and the like. The processor 10d is a hardware circuit, such as a CPU, an MPU, and an ASIC.

As described, the extraction device 10 operates as an information processing device that performs the classification method by reading and executing a program. Moreover, the extraction device 10 can implement functions similar to those in the embodiment described above by reading the above program from a recording medium with a medium reader device, and by executing the read program. The program in other embodiments are not limited to be executed by the extraction device 10. For example, the present invention can be similarly applied also when the program is executed by another computer or server, or when the program is executed by those in cooperation.

This program can be distributed through a network such as the Internet. Moreover, this program can be recorded on a computer-readable recording medium, such as a hard disk, a flexible disk (FD), a compact disk read-only memory (CD-ROM), a magneto-optical disk (MO), and a digital versatile disk (DVD), and be executed by being read by a computer from the recording medium.

In one aspect, it is possible to improve the efficiency of planning and implementation of a measure.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an extraction program that causes a computer to execute a process comprising:
   generating a plurality of combinations of conditions relating to a plurality of item values included in data;
   calculating an index value that indicates a degree of cooccurrence between a specified response variable and each of the plurality of combinations, by using a machine learning model that estimates a response variable from the plurality of item values, the machine learning model having been trained by using the data;
   extracting a specific combination from among the plurality of combinations based on any one of the condition and the index value; and
   displaying a list of the combinations extracted at the extracting, while emphasizing a first combination compared to other combinations when the index value of the first combination, which is a combination of a first condition and another condition, is higher than a first criterion, and when the index value of only the first condition is equal to or lower than a second criterion, out of the combinations extracted at the extracting.

2. The non-transitory computer-readable recording medium according to claim 1, wherein
   the generating includes generating a combination of a response variable and a condition relating to one or more explanatory variables corresponding to the response variable, and
   the calculating includes calculating a plausibility of the response variable of satisfying the condition per combination, as the index value.

3. The non-transitory computer-readable recording medium according to claim 1, wherein the extracting includes extracting a combination, the index value of which is equal to or higher than a predetermined value, from among the combinations.

4. The non-transitory computer-readable recording medium according to claim 1, wherein the generating includes generating a combination of conditions, a frequency of which of matching with the data is equal to or higher than a predetermined value, out of the conditions.

5. The non-transitory computer-readable recording medium according to claim 1, wherein the generating includes generating a combination of conditions relating to a plurality of item values included in data that increases as time passes.

6. An extraction method executed by a computer, the extraction method comprising:
   generating a plurality of combinations of conditions relating to a plurality of item values included in data;
   calculating an index value that indicates a degree of cooccurrence between a specified response variable and each of the plurality of combinations, by using a machine learning model that estimates a response variable from the plurality of item values, the machine learning model having been trained by using the data;
   extracting a specific combination from among the plurality of combinations based on any one of the condition and the index value; and
   displaying a list of the combinations extracted at the extracting, while emphasizing a first combination compared to other combinations when the index value of the first combination, which is a combination of a first condition and another condition, is higher than a first criterion, and when the index value of only the first condition is equal to or lower than a second criterion, out of the combinations extracted at the extracting.

7. An extraction device comprising:
   a processor configured to:
   generate a plurality of combinations of conditions relating to a plurality of item values included in data;
   calculate an index value that indicates a degree of cooccurrence between a specified response variable and each of the plurality of combinations, by using a machine learning model that estimates a response variable from the plurality of item values, the machine learning model having been trained by using the data;
   extract a specific combination from among the plurality of combinations based on any one of the condition and the index value; and
   display a list of the combinations extracted at the extracting, while emphasizing a first combination compared to other combinations when the index value of the first combination, which is a combination of a first condition and another condition, is higher than a first criterion, and when the index value of only the first condition is equal to or lower than a second criterion, out of the combinations extracted at the extracting.

* * * * *